Feb. 9, 1937.    T. FINIZIE    2,069,754
FRUIT JUICE EXTRACTING APPARATUS
Filed June 1, 1933    2 Sheets-Sheet 1
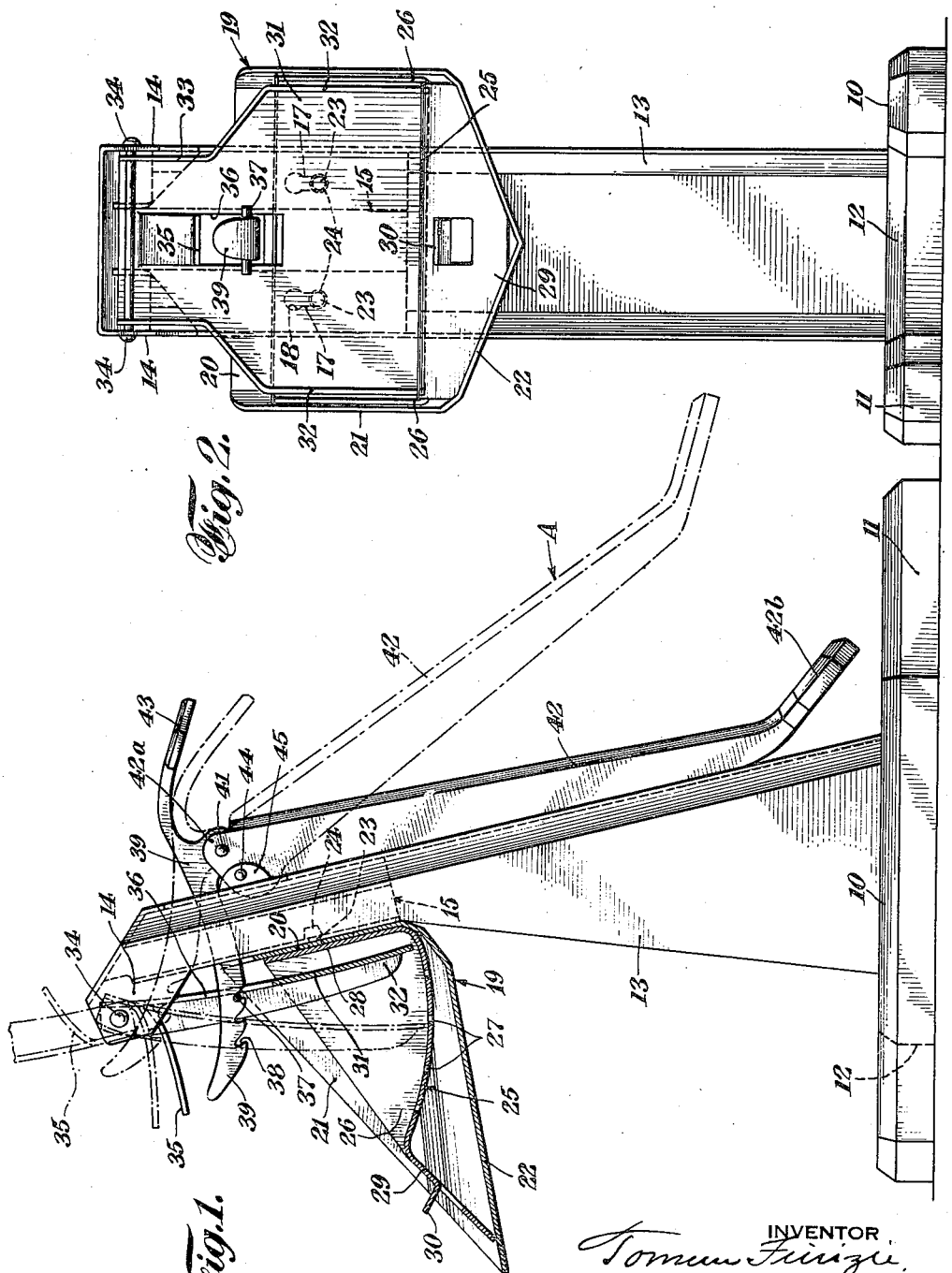

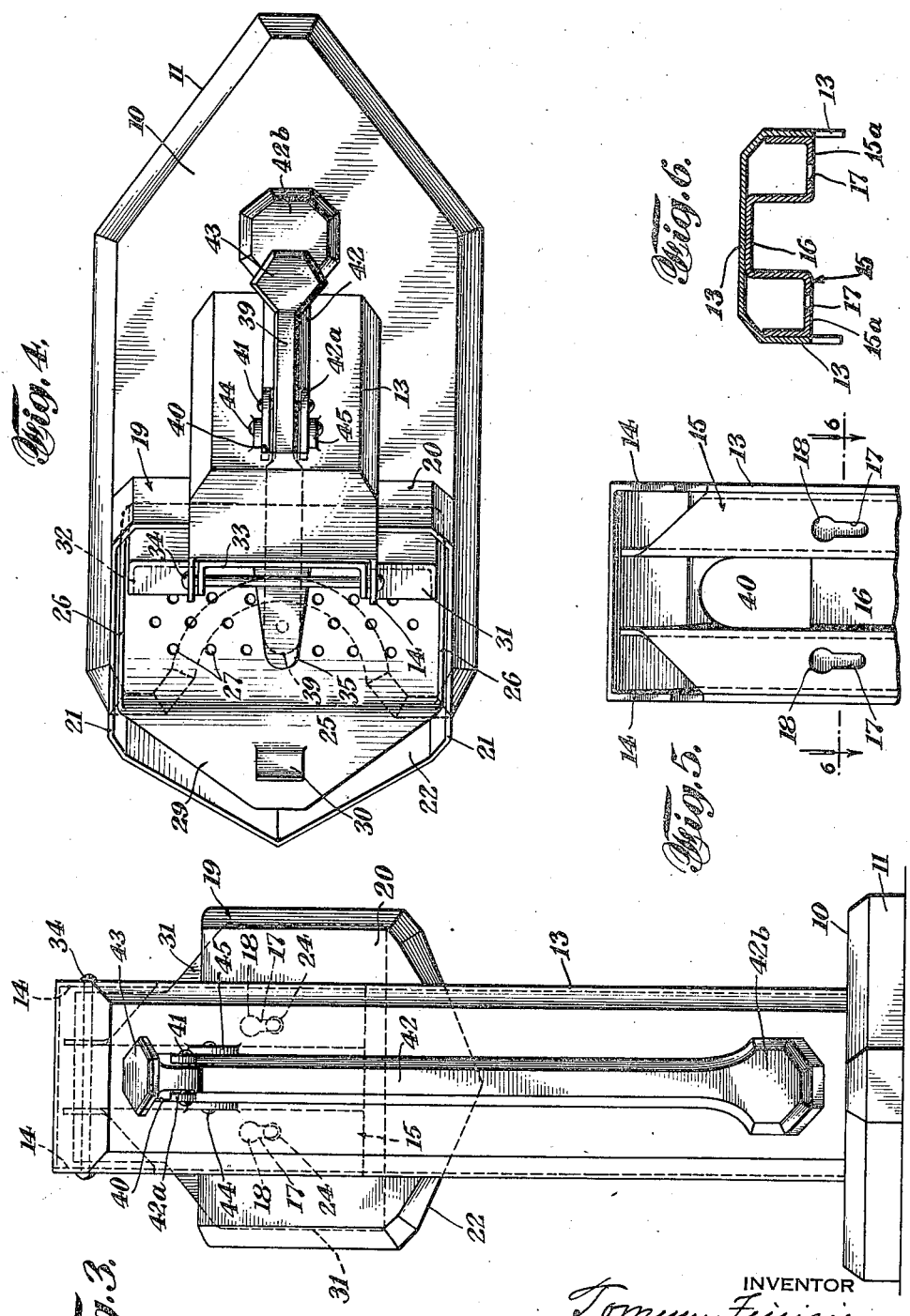

Patented Feb. 9, 1937

2,069,754

UNITED STATES PATENT OFFICE 2,069,754

FRUIT JUICE EXTRACTING APPARATUS

Tomun Finizie, Shrub Oak, N. Y.

Application June 1, 1933, Serial No. 673,805

10 Claims. (Cl. 100—41)

My invention relates to improvements in apparatus for expressing or extracting the juice of fruits, vegetables, meats, and other articles, and the same has for its object to provide an apparatus which is simple in construction, efficient in operation, and inexpensive to manufacture.

Further, said invention has for its object to provide an apparatus consisting of the smallest number of parts possible which may be readily assembled and dismounted without necessitating the use of tools.

Further, said invention has for its object to provide an apparatus whose essential parts are formed of sheet metal and which may be readily taken apart to facilitate the cleaning thereof.

Further, said invention has for its object to provide an apparatus in which a pivotally supporting compression member is adapted to engage the piece of fruit or other article and be successively engaged by an interposed element actuated by an operating lever whereby all the juice may be extracted from the article acted upon.

Other objects will in part be obvious and in part be hereinafter described.

To the attainment of the aforesaid objects and ends my invention consists in the novel features of construction, and in the combination, connection and arrangement of parts hereinafter more fully described and then pointed out in the claims.

In the accompanying drawings—

Figure 1 is a side elevation, partly in section, showing one form of fruit juice extractor constructed according to, and embodying my said invention;

Fig. 2 is a front view thereof;

Fig. 3 is a back view;

Fig. 4 is a plan or top view;

Fig. 5 is a detail front view showing the construction of the upper portion of the supporting standard, and Fig. 6 is a detail cross-section on the line 6—6 of Fig. 5.

In said drawings 10 designates a flat support or base formed of sheet metal, and having a depending flange 11 along its edges. The front end of said base is provided with a substantially semi-circular cut out portion 12 to accommodate a glass or other container to receive the expressed juice. 13 denotes a standard which is substantially U-shape in cross-section, and has its upper end terminating in two separated bearing members 14. The lower end of said standard is secured to the base 10 by welding, soldering or other convenient mechanical means.

Within the upper portion of the hollow standard 13 is secured a reinforcing or stiffening member 15, formed of sheet metal, comprising two parallel longitudinal members 15ª of rectangular cross-section united by an integral intervening web 16. The said reinforcing member which is welded, soldered, or otherwise secured to the standard 13, is provided in its forward sides or walls with slots 17 having enlarged entrance portions 18.

19 denotes a receptacle-spout formed of sheet metal having a flat rear wall or back 20, forwardly tapering side walls 21, and base 22 which tapers from its sides towards its center. The rear wall 20 is provided with two projecting studs 23 having enlarged heads 24. The studs 23 are adapted to engage with the slots 17 of the longitudinal reinforcing members 15, in order to hold the receptacle and spout 19 detachably secured to the upper end of the standard 13.

Within the receptacle spout 19 is loosely disposed a strainer 25 which serves as a false bottom. The strainer 25 has a concave base provided along its longitudinal edges with upwardly extending flanges or walls 26, and between said flanges or walls with perforations 27. From the rear edge of said strainer 25 extends upwardly, parallel with the rear wall 20 of the receptacle 19, a wall member 28, which normally lies closely against said rear wall 20 of the receptacle-spout 19, and from the forward edge of said bottom or strainer 25 projects a forwardly and downwardly extending tapering portion 29 whose front edge terminates a short distance inwardly of the base 22 of the receptacle-spout 19, and is provided with a struck up tongue 30 which serves as a handle or finger portion to facilitate the removal of the strainer 25 from the receptacle-spout 19.

From the upper end of the standard 13 depends a pressure plate or member 31, which is preferably slightly dished, and provided along its vertical edges with flanges 32. The plate 31 has its upper end reduced in width at 33 to fit into the space between the bearings 14 in which it is pivotally supported upon a pin 34, and its lower, free edge swinging in the arc of a circle which corresponds to that of the curvature of the strainer 25. A tongue 35 is struck up from the upper central portion of the pressure plate 31, having its under side rounded to serve as a cam, as hereinafter described. Upon the outer side of the pressure plate 31, adjacent to the lower edge of the aperture 36 formed by the striking up of the tongue 35, is secured a short pin 37, adapted to be engaged by the notches 38 of a rack bar 39 which extends through an aperture 40 in the rear side of the standard 13, and is pivotally secured intermediate its ends by a pin 41 supported in the separated bearings 42ª provided at the upper end of the operating lever 42. The said operating lever 42 is provided at its free end with an enlarged end or head 42ᵇ. The free rear end of the rack bar 39 is provided with an enlarged end or finger portion 43.

The upper separated ends of the operating lever 42 are pivotally mounted upon a pin 44 supported in bearings 45 struck up from the rear wall of the standard 13.

The operation of the apparatus is as follows:

In proceeding to extract the juice, for example, from an orange the end of the operating lever 42 is raised, and simultaneously therewith pressure is applied to the end 43 of the rack bar 39 and the same depressed thereby causing the forward end to rise and become disengaged from the pin 37 of the pressure plate 31. As the forward end of the rack bar 39 continues to rise it will engage with the underside of the tongue 35 of the pressure plate 31, serving as a cam, and cause said pressure plate to swing upwardly out of the receptacle-spout 19, as indicated by dotted lines at Fig. 1. Hereupon the orange is placed in position upon the strainer 25, and pressure upon the end 43 of the rack bar 39 released thereby permitting the same to resume substantially the position indicated in full lines. As the forward end of the rack bar 39 descends one of the notches 38 thereof, for example, the outermost will engage with the pin 37 of the pressure plate 31. At this time the operating lever 42 will still be in about the position indicated by the dotted line A, Fig. 1. The outer end of said operating lever is then depressed, causing the rack-bar 39 and the pressure plate 31 to be drawn rearwardly and towards the rear wall 20 of the receptacle-spout 19, and compress the orange between said parts. If the orange has not been completely exhausted of its juice by this operation, the operating handle 42 is again raised to about the position indicated by the broken lines, and the forward end of the rack-bar 39 caused to be advanced again, and this time engage with the middle, or the innermost notch 38, as the case may be, whereupon the outer end of the operating handle is again depressed, and the orange subjected to further pressure, and the juice remaining therein wholly extracted.

The extracted juice will pass through the apertures 27 of the strainer on to the base 22 of the receptacle-spout, and be discharged from the end thereof, and into the container provided for that purpose disposed below the end of said receptacle-spout. To remove the remaining pulp the rack-bar 39 is again operated, as above described, and the strainer 25 removed from the receptacle-spout 19 by grasping the same by its finger portion 30. After emptying the strainer the same is again restored within the receptacle-spout 19, and the presser plate 31 permitted to resume its normal position by releasing the pressure upon the rear end 43 of the rack-bar 39.

It is to be noted that my improved apparatus comprises a minimum of essential parts which do not necessitate the employment of skilled labor to assemble, and which parts may be readily taken apart for cleaning and as easily reassembled for use by the operator.

Further, it is to be noted that while my apparatus is extremely simple in construction and easy to operate, it is, nevertheless powerful in action.

Having thus described my said invention, what I claim and desire to secure by Letters Patent is:

1. An apparatus of the character described comprising a support, a receptacle mounted thereon, a pressure plate pivotally secured to said support and extending into said receptacle, an operating lever pivotally secured to said support, a link pivoted to and eccentric with respect to said operating lever, and a rack at one end of said link adapted to detachably engage with cooperating means provided on said pressure plate whereby to operate said pressure plate when said operating lever is actuated.

2. An apparatus of the character described comprising a support, a receptacle mounted thereon, a strainer disposed in said receptacle, a pressure plate pivotaly secured to said support and extending into said receptacle, an operating lever pivotally secured to said support, a link pivoted to and eccentric with respect to said operating lever, and a rack at one end of said link extending through said pressure plate and adapted to detachably engage with cooperating means provided on said pressure plate whereby to operate said pressure plate when said operating lever is actuated.

3. An apparatus of the character described comprising a support, a receptacle mounted thereon, a strainer disposed in said receptacle having an upwardly extending wall portion at its rear, a pressure plate pivotally secured at its upper end to said support and having its free portion extending into said receptacle, an operating lever pivotally secured to said support, a link pivotally secured to the end of said operating lever and eccentric with respect to the forward end of said lever and extending through said pressure plate, and a rack at the forward end of said link adapted to detachably engage with cooperating means provided on said pressure plate whereby to operate said pressure plate when said operating lever is actuated.

4. An apparatus of the character described comprising a support, a receptacle detachably mounted thereon, a strainer disposed in said receptacle having an upwardly extending portion at its rear edge, a pressure plate having an aperture therein and pivotally secured at its upper end to said support and having its free portion extending into said receptacle, an operating lever pivotally secured to said support, a link pivotally secured intermediate its ends to the pivoted end of said operating lever and eccentric with respect thereto; the forward end of said link extending through the aperture in said pressure plate, and a rack at the forward end of said link adapted to detachably engage with cooperating means provided on said pressure plate adjacent the aperture therein whereby to draw said pressure plate inwardly when said operating lever is actuated.

5. An apparatus of the character described comprising a support, a receptacle detachably mounted thereon, a strainer disposed in said receptacle having a concave base and an upwardly extending wall at its rear edge, a pressure plate having cam means thereon and an aperture therein below said cam means, and pivotally secured at its upper end to said support and having its depending portion extending into said receptacle, an operating lever pivotally secured to said support, a link pivotally secured intermediate its ends to the pivoted end of said operating lever and eccentric with respect thereto; the forward end of said link extending through said support and the aperture in said pressure plate and engageable with the cam means thereon to raise said pressure plate when the other end of said link is depressed, and a rack at the forward end of said link adapted to detachably engage with cooperating means provided on said pressure plate whereby to draw said pressure plate inwardly when said operating lever is depressed.

6. An apparatus of the character described comprising a support, a receptacle mounted thereon, a pressure member pivotally secured at its upper end to said support and having its free portion extending into said receptacle, an operating lever pivotally secured at one end to said support, a link pivoted to and eccentric with respect to said operating lever, means at one end of said link detachably engaging said pressure plate, and means on said pressure plate cooperating with said link whereby to move said pressure plate upwardly out of said receptacle when said link is dpressed.

7. An apparatus of the character described comprising a support, a receptacle mounted thereon, a pressure member pivotally secured at its upper end to said support and having its free portion extending into said receptacle, an operating lever pivotally secured at one end to said support, a link pivoted to and eccentric with respect to said operating lever, and having one end extending through said pressure plate and provided with a series of notches adapted to engage with cooperating means on said pressure plate, and a cam on said pressure plate adapted to be engaged by the notched end of said link to move said pressure plate upwardly out of said receptacle when the rear end of said link is depressed.

8. An apparatus of the character described comprising a support, a pressure member pivotally mounted thereon, a cam on said pressure member, an operating lever pivotally mounted on said support, and a link pivoted to said lever and having a plurality of means thereon each detachably engageable with said pressure member for moving said pressure member in one direction when said lever is operated; said link being movable into engagement with said cam to move said pressure member in the opposite direction.

9. An apparatus of the character described comprising a support, a receptacle mounted thereon, a swinging pressure plate pivotally secured at one edge to said support and extending into said receptacle, engageable means on said pressure plate, an operating lever pivotally secured to said support, and a member pivotally secured at one end to said operating lever and engageable at a plurality of points of its length with the engageable means on said pressure plate whereby to draw the free portion of said plate inwardly with a step-by-step movement by successive actuation of said operating lever.

10. An apparatus of the character described comprising a support, a receptacle mounted thereon, a swinging pressure plate pivotally secured at one edge to said support and extending into said receptacle, an engageable device on said pressure plate disposed below its pivotally secured edge, an operating lever pivotally secured to said support, and a member pivotally secured at one end to said operating lever and having its other end free, and engaging means adjacent to said free end successively engageable with the engageable device on said pressure plate whereby to draw the free portion of said pressure plate inwardly with a step-by-step movement by successive actuation of said operating lever.

TOMUN FINIZIE.